United States Patent Office 2,865,073
Patented Dec. 23, 1958

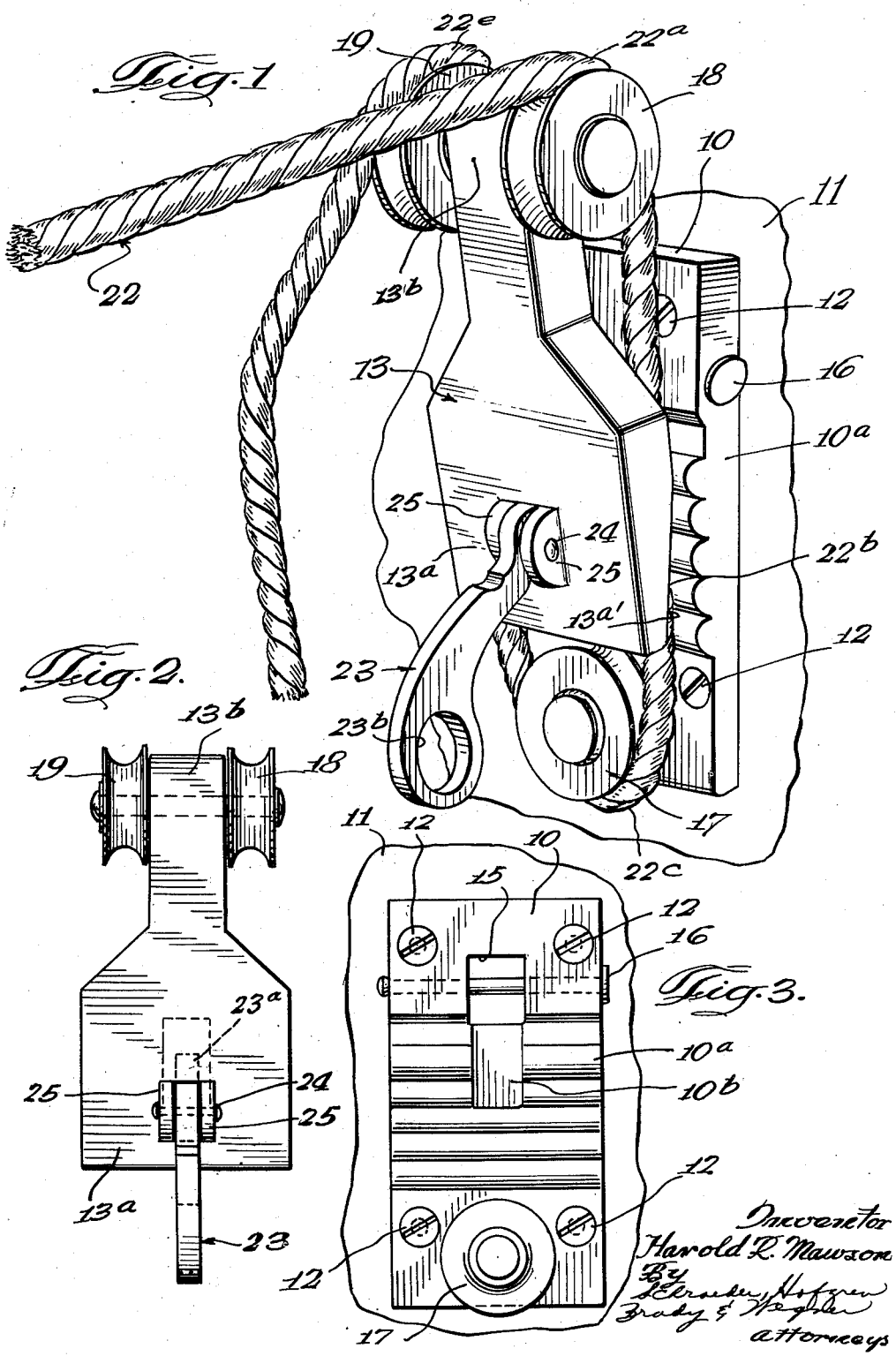

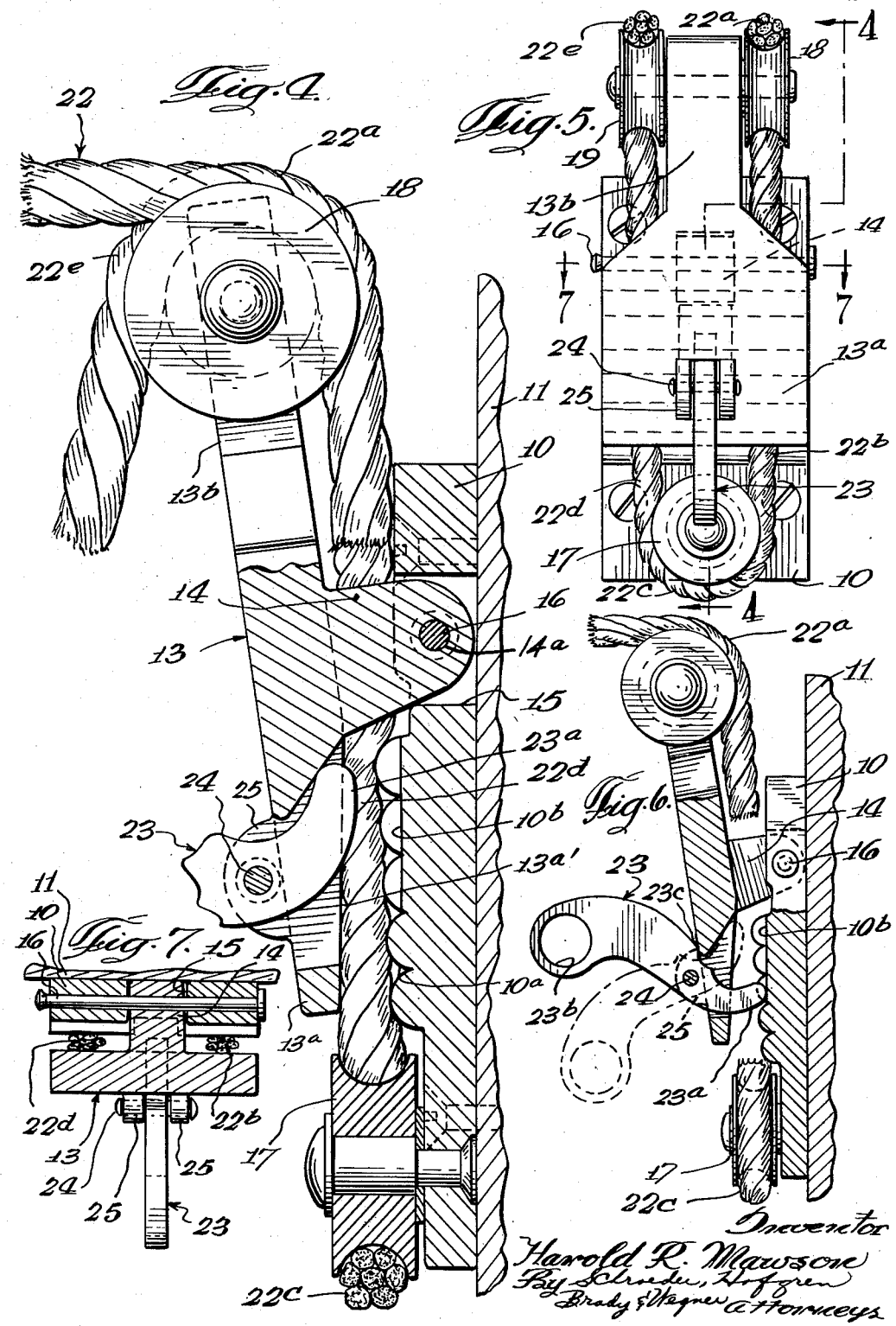

2,865,073
LINE CLAMP
Harold R. Mawson, Peoria, Ill.
Application May 28, 1954, Serial No. 432,959
3 Claims. (Cl. 24—134)

This invention is concerned with a line clamp and more particularly with a line clamp which is especially adapted for use with clotheslines and the like.

It is a principal object of this invention to provide a line clamp to which a line may readily be attached, which may be used either at the end of the line or at an intermediate point thereon, which when used at an intermediate point prevents interaction between the portions of the line on either side thereof, and which provides for the easy release of the line.

One feature of the invention is that it provides a line clamp comprising a base member and a clamping member associated with and movable relative to the base member and adapted to have an intermediate portion of a line engaging the clamp member for movement thereof relative to the base member, part of the portion of the line passing between the members and each end of the line passing over a portion of the clamping member for causing said movement, tension in either end of the line beyond the clamp causing said relative movement of said members toward each other to clamp said line therebetween.

Another feature is that the clamping member is movably secured to the base member by means at a point intermediate the ends of the clamping member and a portion of a line may be passed between one end of the clamping member and the base member while another portion is passed over the other end of the clamping member, tension in the last mentioned portion of the line causing movement of the members together to clamp the line therebetween. A further feature is the inclusion of the means for releasing the line.

Another feature is that the line clamp comprises a base plate adapted to be secured to support means, a pulley mounted at one end of the base plate, a clamping plate having a pivot intermediate the ends thereof, means for pivotally mounting the clamping plate on the base plate, the clamping plate having a portion adapted to bear against the base plate adjacent the pulley, and a pair of pulleys mounted on the clamping plate at the end opposite the clamping portion whereby a line passed over one of the pair of pulleys, between the plates, around the first mentioned pulley, between the plates and over the other of the pair of pulleys may be clamped between the plates by applying tension to either end thereof.

Further features and advantages will readily be apparent from the following specification and from the drawings, in which:

Figure 1 is a perspective view of the line clamp;
Figure 2 is a reduced elevational view of the front surface of the clamping plate;
Figure 3 is a reduced elevational view of the front surface of the base plate;
Figure 4 is a side view, partly in elevation, and partly in section, taken along line 4—4 of Figure 5;
Figure 5 is a reduced front elevation view;
Figure 6 is a reduced side elevational view showing the operation of the releasing means, certain parts being shown in section; and
Figure 7 is a horizontal section taken along line 7—7 of Figure 5.

Reference will now be made to the drawings, wherein numeral 10 indicates a generally rectangular base plate which is attached to a support 11, such as a post, the wall of a building or the like, by a suitable means such as screws 12. Base plate 10 is preferably of metal and may be fabricated by a casting or stamping operation as desired. Clamping plate 13, which is also of metal, is provided with a boss or projection 14 extending outwardly from the rear surface thereof intermediate the end portions of the plate. Boss 14 is adapted to extend into an opening 15 provided in the base plate and has an opening 14a therein which receives pin 16 carried by the base plate, for pivotally mounting the clamping plate on the base plate.

A pulley 17 is rotatably carried on the base plate 10 at the lower end thereof, adjacent the lower or clamping portion 13a of the clamping plate. Pulley 17 is adapted to turn in a plane parallel to the plane of the base plate. A pair of pulleys 18 and 19 are rotatably carried at the upper portion 13b of clamping plate 13, the pivotal mounting arrangement 14 being intermediate the two end portions of the clamping plate. Pulleys 18 and 19 are both mounted to turn in planes generally at right angles to the plane of base plate 10.

A line 22, such as a clothesline may be secured in the clamping device by passing a portion 22a thereof over pulley 18 and a second portion 22b between the clamping portion 13a of the clamping plate and base plate 10, as shown in Fig. 1. If it is desired to secure only the end of an otherwise attached line, this arrangement is sufficient as tension in the portion 22a of the line passing over pulley 18 will cause clamping plate 13 to press the line against base plate 10.

If, however, it is desired to secure an intermediate section of the line, the portion 22c thereof is carried around pulley 17, the portion 22d is passed between the two plates 10 and 13 and the portion 22e is carried over pulley 19. With the line arranged in this configuration, tension in either, or both, of the end sections of the line, one end being a continuation of portion 22a and the other being a continuation of 22e, will effect clamping of the line between the base plate 10 and clamping plate 13. The use of the term "end section" of the line is not intended to mean the actual end of the line, but only the section adjacent the intermediate portion which is secured in the clamping device. Actually, in practice a line is often strung in a number of individual sections or spans and the clamping device may be used at the end of each span.

It should be noted that the rear surface 13a' of the clamping portion 13a of plate 13 is cut away at an angle in order that an extended portion of the line 22 may be contacted, enhancing the clamping effect (Figure 4). In addition, the surface of base plate 10 underlying the clamping portion 13a of the clamping plate is provided with corrugations 10a to increase the holding effect on the line.

Where the line clamp is used at an intermediate point on a line, tension on the line on either side of the clamp provides the necessary force on plate 13 to effect clamping. It should also be noted that in this situation changes in the condition of the line on one side of the clamp have no effect on the condition of the line on the other side. For example, if the section of the line forming an extension of portion 22e were to break under load, the clamp would continue to hold the line and the section thereof forming an extension portion 22a would not be affected. Similarly, if a heavy load is attached to the section of the line on one side of the clamp, it will have no effect on the load on the other section.

A line release member 23 is pivotally carried by pin 24 extending between legs 25 on the outer surface of the clamping portion 13a of the clamping plate and has a cam portion 23a which extends through an opening in the clamp plate and may be moved into engagement with the base plate 10 lifting it from line 22, Figure 6. The outer end of member 23 is provided with a finger opening 23b to facilitate its use; and the projection 23c on the release member is positioned to contact the clamp plate when the cam portion 23a is just past the center of its pivot to permit the clamp to be locked in an open position. The portion 10b of the surface of the base plate which the cam portion 23a of the release member contacts is smooth. This provides a simple and readily operable means for releasing the line clamp permitting removal of the line.

While I have shown and described certain embodiments of my invention, it is to be understood that it is capable of many modifications. Changes therefore in the construction and arrangement may be made without departing from the spirit and scope of the invention as disclosed in the appended claims.

I claim:

1. A line clamp of the character described, comprising: a planar base plate adapted to be secured to support means; a pulley mounted centrally at the lower end of said base plate and rotatable about an axis normal to the plane of the base plate; a clamping plate having a pivot intermediate the ends thereof; means pivotally mounting said clamping plate on said base plate, said clamping plate having a clamping portion adapted to bear against said base plate adjacent said pulley; and a pair of pulleys mounted on said clamping plate at the end opposite said clamping portion and above the top of the base plate, one pulley on either side of a plane through the pulley mounted on the base plate and normal to the base plate, and each rotatable about an axis transverse of the clamping plate whereby a line passed over one of said pair of pulleys, between said plates, around said first mentioned pulley, between said plates and over the other of said pair of pulleys may be clamped between said plates by applying tension to either end thereof.

2. A line clamp of the character described, comprising: a base plate adapted to be secured to support means; a clamping plate having a mounting element intermediate the ends thereof and having a clamping surface below the element; a pivot engaging said mounting element, movably mounting the clamping plate on the base plate whereby a line passed over the portion of the clamping plate above the pivot and between the clamping and base plates is secured therebetween by applying tension to the line; and a release member pivoted to the clamping plate and having an end portion extending therethrough, the end portion being movable into engagement with the base plate to separate said members thereby releasing the line, continued movement of said release member bringing it into an over-centered position, locking said line clamp open.

3. A line clamp of the character described, comprising: a flat base plate adapted to be secured to support means, the lower portion of the base plate being corrugated and the base plate having an opening therein centrally located above the corrugated portion; a flat clamping plate having an apertured boss intermediate the ends thereof and adapted to extend into said opening; a pivot pin journalled in said base member and extending through said opening and the aperture in said boss, pivotally mounting said clamp plate on said base plate and in spaced relation thereto, whereby a line passed over the portion of the clamping plate above the pivot and between the clamping and base plates is secured therebetween by applying tension to the line, the portion of the clamping plate below the pivot having an inclined portion adapted to engage an extended portion of the line; a single cam release member pivotally mounted centrally of said clamping plate below said pivot and having an end extending therethrough for engagement with said base plate on movement of said cam member, continued movement of the cam member bringing it into an over centered position locking the line clamp open, the surface of said base plate adjacent the end of said cam member being smooth whereby movement of the cam member into engagement with the base plate effects release of said line.

References Cited in the file of this patent

UNITED STATES PATENTS

| | | | |
|---|---|---|---|
| D. 29,310 | Goode | Sept. 6, | 1898 |
| 69,696 | Peters et al. | Oct. 8, | 1867 |
| 521,971 | Betka | June 26, | 1894 |
| 895,590 | Sprague | Aug. 11, | 1908 |
| 1,265,620 | Cubiac | May 7, | 1918 |
| 1,424,537 | Weth | Aug. 1, | 1922 |
| 1,433,829 | Klaas | Oct. 31, | 1922 |
| 1,457,576 | Jenonis | June 5, | 1923 |
| 2,043,299 | Martin | June 9, | 1936 |
| 2,204,663 | Chalchoff | June 18, | 1940 |
| 2,490,862 | Elsner | Dec. 13, | 1949 |